May 28, 1935.  C. FUCHS  2,002,735
ADJUSTABLE BLADE RUNNER
Filed Nov. 19, 1931
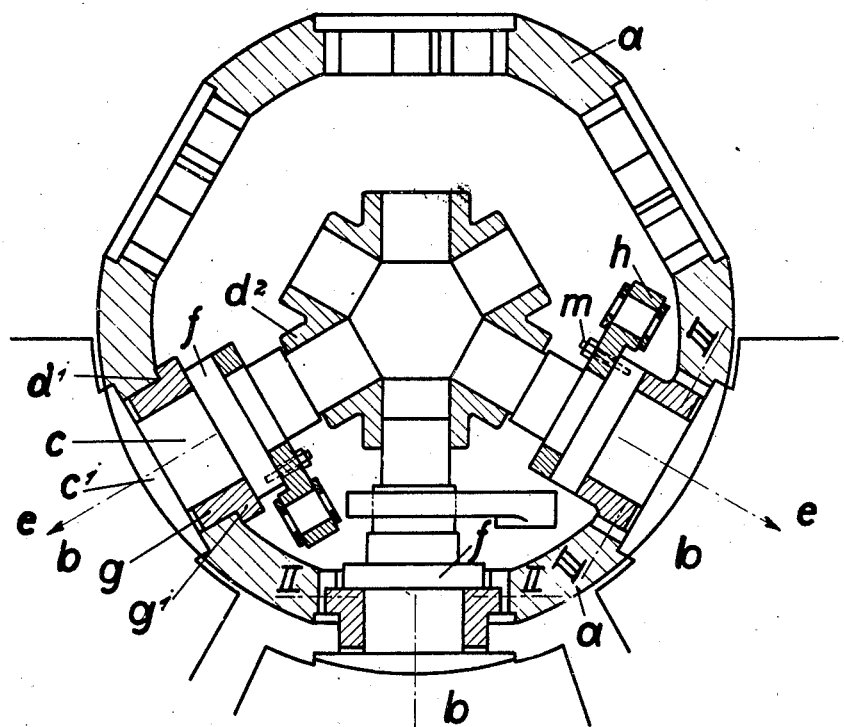
Fig. 1
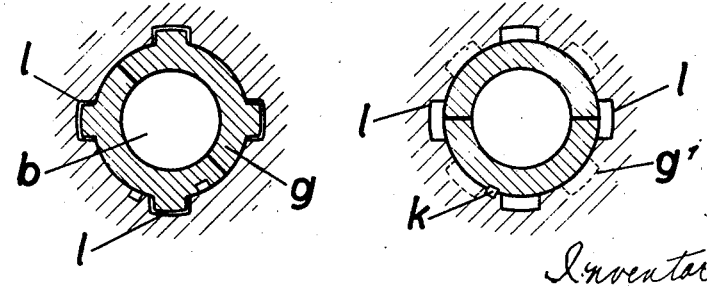
Fig. 2
II-II
Fig. 3
III-III
Inventor
Carl Fuchs
by C. L. Goepel
his attorney Patented May 28, 1935

2,002,735

UNITED STATES PATENT OFFICE 2,002,735

ADJUSTABLE BLADE RUNNER

Carl Fuchs, Mergelstetten, near Heidenheim-on-the-Brenz, Germany

Application November 19, 1931, Serial No. 575,987
In Germany November 24, 1930

9 Claims. (Cl. 253—148)

This invention relates to centrifugal machines, and more particularly to an improved runner wheel for such machines, the invention having for its general object and purpose, to provide a runner wheel of simple and inexpensive construction which is particularly designed for use in connection with turbines and like centrifugal machines having runners of large dimensions and operating under comparatively high heads.

It is a more particular object of the invention to provide an improved mounting for the runner blade trunnions in the wheel hub body, wherein rocker or crank arms are rigidly connected with the blade trunnions for rotatably adjusting the blades, whereby axial thrusts incident to centrifugal forces will be transmitted to the outer body wall of the hub, so that the rocker arms are not subjected to axial thrust pressure which would operate to resist the transmission of turning or torque moment to the blades.

It is also a particular object of my invention to provide a sectional bushing surrounding the trunnion between one end of the blade and a collar rigidly fixed on the trunnion, and said bushing sections being inserted simultaneously with the trunnions through openings in the wheel hub wall, and provided with means at their inner ends seating against the inner face of said wall and transmitting the axial thrusts through said collars to the wall of the hub. In this manner I provide a runner blade mounting whereby the openings through the hub wall may be of comparatively small diameter, and said wall between adjacent openings being therefore of such rugged or substantial construction as to successfully withstand very high stresses devolving thereon in the operation of the runner wheel.

With the above and other objects in view, my invention consists in the improved runner wheel for centrifugal machines, and in the form, construction, and relative arrangements of its several parts, as will be hereinafter more fully described, illustrated in the accompanying drawing, and subsequently incorporated in the subjoined claims.

In the drawing wherein I have illustrated one simple and practical embodiment of the invention, and in which reference characters designate corresponding parts throughout the several views, Fig. 1 is a sectional view through the wheel or runner head taken in the plane of the axes of the blade trunnions.

Fig. 2 is a detail sectional view taken on the line II—II of Fig. 1.

Fig. 3 is a similar sectional view on the line III—III of Fig. 1.

Referring in detail to the drawing, the hub body "a", which may be of any suitable predetermined diameter and wall thickness, is provided at circumferentially spaced points in its wall, with openings to receive the runner blade trunnions. As herein shown, the part "c" of each trunnion "c'", is provided in suitably spaced relation to one end of the blade, with a rigidly fixed collar "f" which may be integral with the trunnion, or otherwise secured thereto as desired. Prior to the insertion of the blade trunnion through the opening in the hub wall, a bushing "g", consisting of similar sections or halves, is assembled upon the trunnion between the end of the blade and the collar "f". Each bushing section is provided at the one end thereof abutting against the collar "f", with radially projecting lugs "g'", adapted to pass freely through the slots "l", formed in the wall of the hub body. The bushing is then turned to disaline these lugs relative to the slots "l", thus locking the bushing against outward movement through the opening in the hub wall, and seating said lugs against the inner face of said wall as clearly indicated in dotted lines in Fig. 3 of the drawing, and at "d'" in Fig. 1 thereof.

The inner end of the blade trunnion "c'" is received in a bearing seat indicated at "$d_2$", which may be integrally formed with the hub body in the usual manner. As the trunnion of each runner blade "b", with its assembled bushing "g", is thus inserted through an opening in the hub wall, it is received through the eye or opening of a crank or rocker arm "h", arranged within the hub body, which crank is then rigidly fixed to the inner face of the collar "f", in any preferred manner, as by means of one or more bolts indicated at "m". Suitable means, such as the key "k", is also then applied for locking the sectional bushing "g" against rotation relative to the hub wall, and the blade trunnion "c".

It will be evident from the above description that I have provided a very simple means capable of easy and quick assemblage, whereby the setting of the runner blades can be readily effected without necessitating twisting or displacement of the blade out of radial relation to the hub body. Water pressure against the runner blades in the direction of the turbine axis, will be taken up at the bearing seats "d'" and "$d_2$" for the blade trunnions.

The transmission of axial or radial thrusts incident to centrifugal forces in the direction indicated at "e" in Fig. 1 of the drawing, takes place through the rigidly fixed collars "f" and the bushing "g" to the hub wall, the rocker arm "h" being wholly relieved from such axial thrust pressure, so that the turning moment transmitted by said arm to the blade "b" need overcome only the frictional resistance at the inner bearing "$d_2$" and the bushing "g". The fact that the rocker arm "h" is relieved of such axial pressure furthermore, permits this arm to be formed with a very short hub, whereby a maximum of space is obtained, permitting the use of bearings "$d_2$" and bushing "g" of considerable length with a wheel hub of comparatively small diameter. This is very important with respect to the specific pressure and consequent wear on these elements.

By reason of the bayonet slot connection between the bushing sections and the hub body, the opening in the wall of the hub is of minimum diameter, thus providing ample wall structure between adjacent openings for taking up all radial and axial stress. The invention is thus particularly adaptable to blade wheel turbines operating under very high heads and having runners of large dimensions.

From the above the description, the manner of use, and several advantages of my present invention, will be readily understood. It will be seen that I have devised an improved mounting for the runner blades, the several parts of which are of simple and rugged construction, inexpensive to manufacture, and capable of efficiently functioning for the intended purpose. While I have herein shown and described one practical structural embodiment of the invention, it is nevertheless to be understood that the essential features thereof may also be incorporated in various other alternative structural forms. Accordingly, the privilege is reserved of resorting to all such legitimate changes therein as may be fairly embodied within the spirit and scope of the invention as claimed.

I claim:

1. A runner including a one-piece hub body, runner blades, each having a trunnion provided with a rigidly fixed collar in spaced relation to the blade and the end of the trunnion, the said hub body having openings in its wall receiving the blade trunnions, bearing means within the hub body for the inner ends of the blade trunnions, split bushings within said openings bearing at their inner ends against one side of said collars and having bayonet joint means seated against the inner face of the body wall of the hub to transmit axial thrust thereto, each trunnion, with its collar and bushing, being insertable as a unit through one of the hub openings from the exterior thereof and rocker arms for rotatably adjusting the blades rigidly fixed to the opposite side of each collar within the hub body.

2. A runner including a one-piece hub body, runner blades, each having a trunnion provided with a rigidly fixed collar in spaced relation to the blade and the end of the trunnion, said hub body having openings in its wall receiving the blade trunnions, bearing means within the hub body for the inner ends of the blade trunnions, a bayonet joint split bushing assembled on each trunnion between the blade and said collar, and insertable with the trunnion through the opening in the hub wall from the exterior thereof, said bushing having means at its inner end seated against the inner face of the body wall of the hub to transmit axial thrust of the trunnion collar thereto, and rocker arms for rotatably adjusting the blades rigidly fixed to the opposite side of each collar within the hub body.

3. A runner including a one-piece hub body, runner blades, each having a trunnion provided with a rigidly fixed collar in spaced relation to the blade, said hub body having openings in its wall receiving the blade trunnions, bearing means within the hub body for the inner ends of the blade trunnions, a bushing comprising half sections assembled on the trunnion between the blade and said collar insertable with the trunnion through the opening in the hub wall, each half of the bushing having a bayonet slot connection with said wall, including lugs on the inner ends of each bushing section seating against the inner face of the hub wall to transmit axial thrusts of said collar thereto, means for locking said bushing against rotative movement relative to the hub wall and the trunnion, and rocker arms for rotatably adjusting the blades rigidly fixed to the opposite side of each collar within the hub body.

4. A runner including a one piece hub body having circumferentially spaced openings in its wall, runner blades each having a trunnion, a fixed collar on the trunnion intermediate of its ends, a split bushing surrounding the trunnion between the blade and the collar, said collar being of greater diameter than the bore of the bushing, said bushing and collar being insertable with the trunnion through an opening in the hub wall from the exterior thereof and having means on one end seated against the inner face of said wall to transmit axial thrust of the trunnion collar thereto, a bayonet joint in the hub body coacting with said split bushing, and a rocker arm engaged upon the trunnion and rigidly fixed to said collar.

5. In a runner wheel, the combination of a one-piece hub body having trunnion receiving openings extending from the exterior to the interior thereof, a trunnion, a bushing surrounding the trunnion, a collar integral with the trunnion and intermediate of its ends, said collar having a larger outside diameter than the bore of the bushing, and a bayonet joint connection between the bushing and the hub body, whereby said trunnion with its collar and bushing is adapted to be inserted as a unit through one of the openings in the hub body from the exterior thereof, and held therein by the action of the bayonet connection, said bushing when inserted into the hub body being seated against the inner face of the hub body to transmit axial thrust of the trunnion collar thereto.

6. An adjustable blade runner having a hub, a plurality of trunnion receiving openings formed in the hub, a blade having a trunnion mounted in each said opening, a bushing mounted in each said opening and constituting a bearing for said trunnion, a collar formed on the trunnion and bearing against the bushing for limiting outward axial movement of the trunnion, said bushing having means at its inner end seated against the inner face of the wall of the hub to transmit axial thrust of said collar thereto, and a crank arm mounted on the trunnion and fastened to said collar.

7. An adjustable blade runner having a hub, a plurality of trunnion receiving openings formed in the hub, a blade having a trunnion mounted in each opening, a split bushing detachably mounted in each opening and constituting a bearing for said trunnion, a collar formed on the trunnion and bearing against the bushing for preventing axial movement of the trunnion with respect to the hub, said bushing having means at its inner end seated against the inner face of the wall of the hub to transmit axial thrust of said collar thereto, and a rocker arm for rotatably adjusting each blade mounted on the trunnion and fastened to said collar.

8. A runner including a hollow hub, runner blades each having a trunnion provided with a rigidly fixed collar in spaced relation to the blade and the end of the trunnion, openings formed in the hub for the trunnions, bushings within said openings bearing at their inner ends against one side of said collars, flanges formed on said bushings and bearing against the inner face of the wall of the hub to transmit axial thrusts thereto, and rocker arms for rotatably adjusting the blades rigidly fixed to the opposite side of each collar within the hub.

9. A runner including a hollow hub, runner blades each having a trunnion formed with a collar in spaced relation to the blade and the end of the trunnion, said hub having openings in its wall receiving said trunnions, a bushing on each trunnion between the blade and said collar, said bushing having means at its inner end seated against the inner face of the wall of the hub to transmit axial thrust of said collar thereto, and rocker arms for rotatably adjusting the blades rigidly fixed to the opposite side of each collar within the hub.

CARL FUCHS.